United States Patent
Lee et al.

(10) Patent No.: US 9,633,416 B1
(45) Date of Patent: Apr. 25, 2017

(54) ADAPTIVE CONTROL FOR DENOISE FILTERING

(71) Applicants: Teahyung Lee, Chandler, AZ (US); Hyeong-Seok Victor Ha, Los Gatos, CA (US); Yi-Jen Chiu, San Jose, CA (US)

(72) Inventors: Teahyung Lee, Chandler, AZ (US); Hyeong-Seok Victor Ha, Los Gatos, CA (US); Yi-Jen Chiu, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/998,191

(22) Filed: Dec. 26, 2015

(51) Int. Cl.
| | |
|---|---|
| *G06T 5/00* | (2006.01) |
| *H04N 5/14* | (2006.01) |
| *G06T 5/40* | (2006.01) |
| *G06T 7/20* | (2017.01) |

(52) U.S. Cl.
CPC ............... *G06T 5/002* (2013.01); *G06T 5/40* (2013.01); *G06T 7/20* (2013.01); *H04N 5/144* (2013.01); *G06T 2207/10016* (2013.01); *G06T 2207/20004* (2013.01); *G06T 2207/20182* (2013.01); *G06T 2207/20201* (2013.01)

(58) Field of Classification Search
USPC ......................................... 382/261, 268, 275
See application file for complete search history.

(56) References Cited

U.S. PATENT DOCUMENTS

| | | | | |
|---|---|---|---|---|
| 6,792,159 | B1 * | 9/2004 | Aufrichtig | ............. H04N 5/367 348/E5.081 |
| 6,933,983 | B2 * | 8/2005 | Wredenhagen | ........... G06T 7/40 348/607 |
| 7,961,972 | B2 * | 6/2011 | Yang | ...................... G06T 5/002 345/601 |
| 8,542,744 | B2 * | 9/2013 | Stojancic | ............... H04N 19/80 348/715 |
| 8,564,724 | B2 * | 10/2013 | Hong | ................... H04N 5/2176 348/447 |
| 8,743,287 | B2 * | 6/2014 | Zhong | ................... H04N 5/144 348/619 |
| 9,160,912 | B2 * | 10/2015 | Liang | .................... H04N 5/2256 |
| 2010/0165207 | A1 * | 7/2010 | Deng | .................... H04N 5/213 348/620 |
| 2010/0272191 | A1 * | 10/2010 | Dorea | ................. H04N 19/159 375/240.29 |
| 2012/0081553 | A1 * | 4/2012 | Cote | ...................... H04N 9/045 348/207.1 |

\* cited by examiner

*Primary Examiner* — Ishrat I Sherali
(74) *Attorney, Agent, or Firm* — Lynch Law Patent Group, P.C.

(57) ABSTRACT

Systems, apparatus, articles, and methods are described below including operations for adaptive control for denoise filtering.

22 Claims, 7 Drawing Sheets

ADAPTIVE CONTROL FOR DENOISE FILTERING

BACKGROUND

Denoise Filters (DN module) are one of the essential blocks for video processing to improve visual quality by reducing noise. However, while noise reduction is applied, some unwanted effects could be created.

Typical denoising methods generally perform adequate noise reduction. However, temporal artifacts due to temporal noise filtering (TNF) in a video pipe can be generated depending on variances in the input contents.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
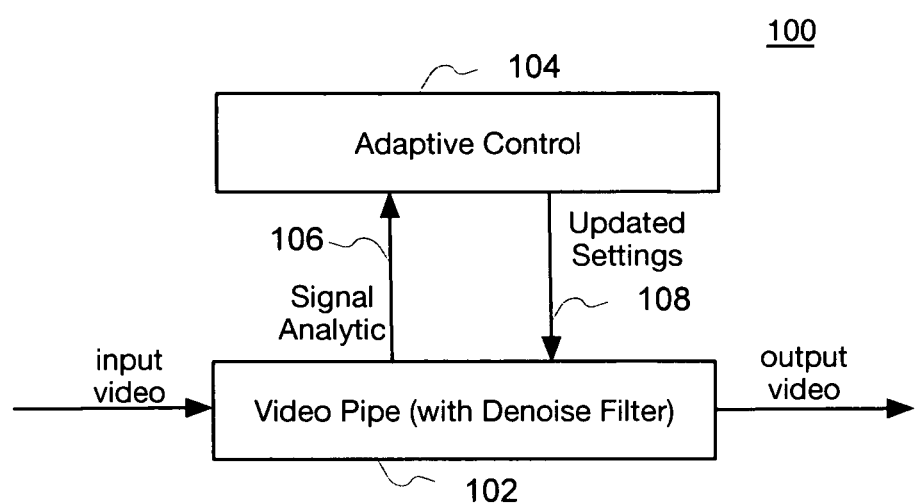
FIG. 1 is an illustrative diagram of an example video processing system.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for adaptive control for denoise filtering.

As described above, denoise Filters (DN module) are one of the essential blocks for video processing to improve visual quality by reducing noise. While typical denoising performs good noise reduction, temporal artifacts due to temporal noise filtering (TNF) in the video pipe can be generated if the input contents have moderate or high motion range (especially progressive case). For example, when noise reduction is applied, some unwanted effects such as motion blurring or luma/chroma out-of-phase issues can be created.

As will be described in greater detail below, techniques are described herein that discuss how to control denoising adaptively to avoid such temporal or spatial over-filtering issues. For example, techniques described herein may implement motion adaptive denoise filter control based at least in part on signal analytics that may include a lightness/darkness estimate, a noise level estimate, and temporal information.

FIG. 1 is an illustrative diagram of an example video processing system 100, arranged in accordance with at least some implementations of the present disclosure. In various implementations, video processing system 100 may be configured to undertake motion adaptive denoise filter control. For example, video processing system 100 may implement motion adaptive denoise filter control based at least in part on signal analytics that may include a lightness/darkness estimate, a noise level estimate, and temporal information.

In the illustrated example, video processing system 100 may include a video pipe 102 and an adaptive control 104. Video pipe 102 may output video based on processed input video.

Adaptive control 104 may send updated settings 108 to undertake motion adaptive denoise filter control of video pipe 102. For example, adaptive control 104 may send updated settings 108 to undertake motion adaptive denoise filter control of video pipe 102 based at least in part on signal analytics 106 that may include a lightness/darkness estimate, a noise level estimate, and temporal information. Control logic for adaptive control 104 can be in software level (e.g., via a driver) while data from signal analytics 106 can be calculated in hardware for fast processing.

In some examples, video processing system 100 may include additional items that have not been shown in FIG. 1 for the sake of clarity. For example, video processing system 100 may include a processor, a radio frequency-type (RF) transceiver, a display, and/or an antenna. Further, video processing system 100 may include additional items such as a speaker, a microphone, an accelerometer, memory, a router, network interface logic, etc. that have not been shown in FIG. 1 for the sake of clarity.

As will be discussed in more detail below, in some implementations, video processing system 100 may be included in a graphics processing unit (GPU) and/or central processing unit (CPU) (not shown here). Accordingly video pipe 102 may balance a combination of fixed function hardware portions of the pipeline with programmable portions of the pipeline. For example, fixed function media accelerators may allow for lower latency operations. Such fixed function media accelerators may include dedicated video processing units to perform functions, such as fixed function hardware for: video scaling, denoise filter, deinterlacer, detail/edge enhancement filter (not shown), and/or image enhancement (IE) logic module.

Additionally or alternatively, while the system and methods discussed herein for adaptive control for denoise filtering have been explained in the context of video pipe 102, these system and methods for adaptive control for denoise filtering may also be applied in the same or similar manner to denoise filters located in an encoder (e.g., as a pre-processing operation) and/or in a decoder (and/or decoder loop of an encoder).

As will be discussed in greater detail below, video processing system 100 may be used to perform some or all of the various functions discussed below in connection with FIGS. 3 and/or 4.

Additional details regarding the functioning of video processing system 100 are illustrated below with regard to FIG. 2.

Figure 2:
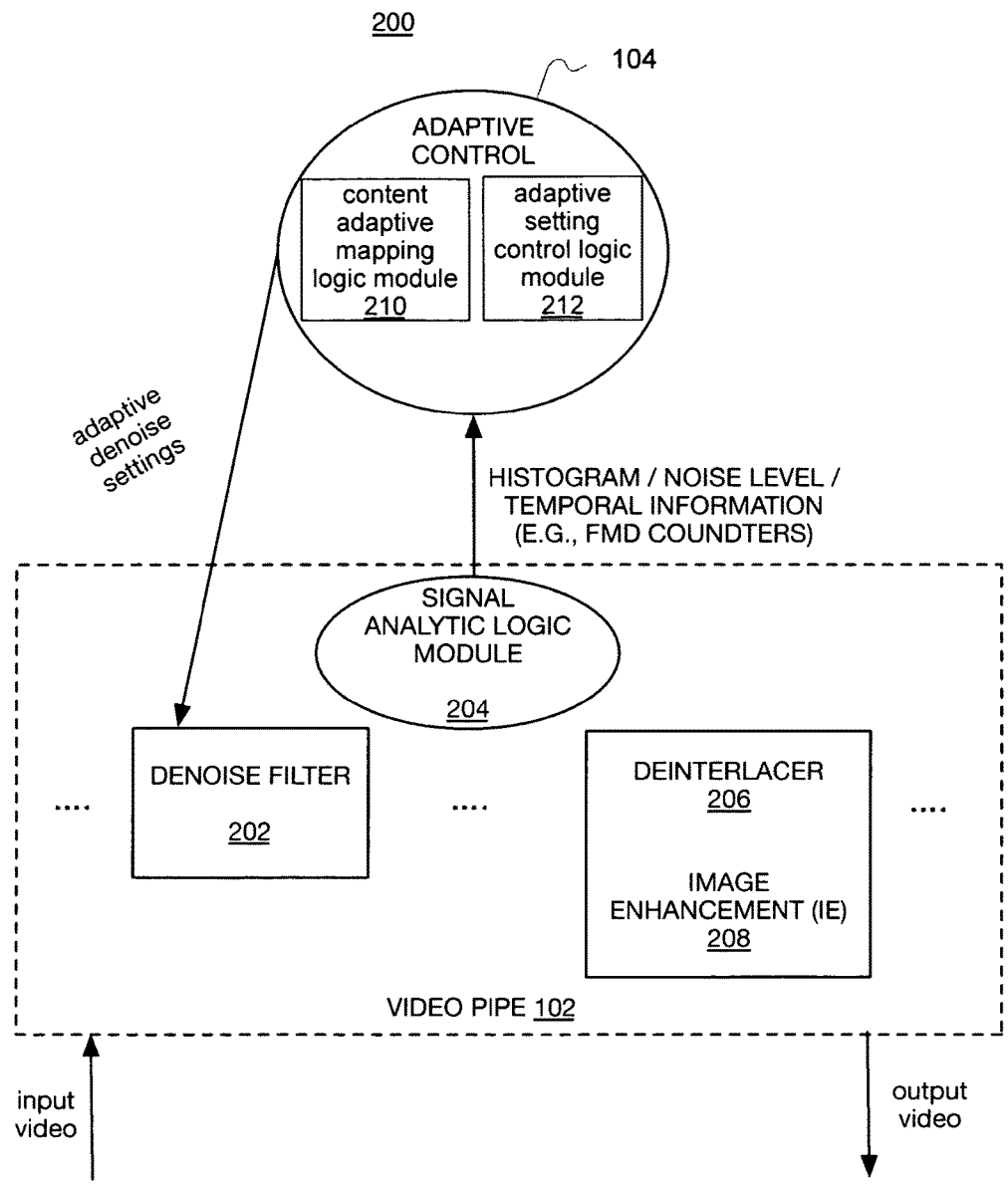
FIG. 2 is an illustrative diagram of an example video processing system.

FIG. 2 is an illustrative diagram of an example video processing system 200, arranged in accordance with at least some implementations of the present disclosure. In various implementations, video processing system 200 may be configured to undertake motion adaptive denoise filter control. For example, video processing system 200 may implement motion adaptive denoise filter control based at least in part on signal analytics that may include a lightness/darkness estimate, a noise level estimate, and temporal information.

In the illustrated example, video processing system 200 may include video pipe 102 and adaptive control 104. Video pipe 102 may output video based on processed input video, and may include denoise filter 202, signal analytic logic module 204, deinterlacer 206, image enhancement (IE) logic module (e.g., IMAGE ENHANCEMENT WITH COLOR PROCESSING (IECP) or the like) 208, the like, and/or combinations thereof. In some examples, video pipe 102 may include additional items that have not been shown in FIG. 1 for the sake of clarity.

Denoise filter 202 may detect noise and motion and use this to filter block from the video stream. For example, denoise filter 202 may filter with a temporal filter and/or a spatial filter, depending on conditions. Noise estimates may be kept between frames and blended together.

In some examples, denoise filter 202 may detect noise via one or more a noise estimate-type algorithms. For example, denoise filter 202 may detect noise via any properly working noise level estimation method, such as a frame-level noise estimate algorithm, a Global Noise Estimate-type (GNE) algorithm, the like, and/or combinations thereof. For example, a Global Noise Estimate (GNE) algorithm may utilize a Block Noise Estimate (BNE), which may estimate the noise over the entire block. The Global Noise Estimate (GNE) algorithm may be calculated at the end of the frame by combining all the Block Noise Estimates (BNEs). The final noise estimate value (e.g., a final Global Noise Estimate (GNE) value) may be used to control the denoise filter 202 for the next frame.

As illustrated, in some implementations, the noise level analysis (e.g., as GNE-type noise level) may be determined via denoise filter 202 and supplied to adaptive control 104.

In some examples, signal analytic logic module 204 may be implemented as part of the software for adaptive control module 104. In other examples, signal analytic logic module 204 may be implemented as part of the denoise filter 202 in hardware or as a software (or firmware) module. In operation, signal analytic logic module 402 may generate input signal analytic information to be used by adaptive control 104.

Deinterlacer 206 may estimates how much motion is deinterlaced across fields. For example, low motion scenes may be reconstructed by averaging pixels from fields from nearby times (temporal deinterlacer), while high motion scenes may be reconstructed by interpolating pixels from nearby space (spatial deinterlacer).

In some examples, deinterlacer 206 (and/or signal analytic module 204) may detect temporal motion variance via Film Mode Detection (FMD) Variances, any other temporal statistic between frames over video, the like, and/or combinations thereof. For example, such Film Mode Detection (FMD) may determine if the input fields were created by sampling film and converting it to interlaced video. If so deinterlacer 206 may be turned off in favor of reconstructing the frame from adjacent fields. Various sum-of-absolute differences may be deinterlacer per block. The Film Mode Detection (FMD) algorithm may be run at the end of the frame by looking at the variances of all blocks for both fields in the frame.

As illustrated, in some implementations, the temporal motion variance (e.g., as Film Mode Detection (FMD) Variances) may be determined via the deinterlacer 206 and supplied to adaptive control 104. Additionally or alternatively, in some implementations, the Film Mode Detection (FMD) Variances may be determined via the signal analytic logic module 204 and supplied to adaptive control 104.

Image enhancement (IE) logic module (IMAGE ENHANCEMENT WITH COLOR PROCESSING (IECP)) 208 may integrate features like skin tone enhancement, adaptive contrast, and/or and the like.

In some examples, image enhancement (IE) logic module (IMAGE ENHANCEMENT WITH COLOR PROCESSING (IECP)) 208 (and/or signal analytic module 204) may provide luma analysis of pixels at different luma values. In some examples, such luma analysis may include the use of a luma histogram. In one example, such a luma histogram may be an Ace Histogram. For example, the Ace Histogram may count the number of pixels at different luma values. The Ace Histogram typically has several bins, each of which has a fixed number of bits. Any count that exceeds the fixed number of bits may be clamped to the maximum value.

As illustrated, in some implementations, the luma level analysis (e.g., as luma histograms) may be determined via image enhancement (IE) logic module (IMAGE ENHANCEMENT WITH COLOR PROCESSING (IECP)) 208 and supplied to adaptive control 104. Additionally or alternatively, in some implementations the luma level analysis may be determined via signal analytic logic module 204 and supplied to adaptive control 104.

In the illustrated example, adaptive control 104 may include content adaptive mapping logic module 210 and/or adaptive setting control logic module 212. In operation, content adaptive mapping logic module 210 may create content adaptive parameters based on the signal analytic information from signal analytic logic module 204. In operation, adaptive setting control logic module 212 may apply optimal content adaptive denoise settings in a continuous fashion to denoise filter 202. For example, by using the FMD counter information from deinterlacer 206 (or any other temporal statistic between frames over video, the like, and/or combinations thereof), the motion range level can be inferred as variance of temporal difference between same polarity fields/frames of current and previous inputs. In addition, the estimated noise level can be rescaled with average luminance level per frame to reflect the human visual system (HVS) sensitivity to the noise in the dark area.

In the illustrated example, the denoise filter 202, signal analytic logic module 204, deinterlacer 206, and image enhancement (IE) logic module 208 illustrated blocks are illustrated as operating in a particular order. However, operation of the denoise filter 202, signal analytic logic module 204, deinterlacer 206, and image enhancement (IE) logic module 208 may, in some cases, be performed concurrently or in a different order than that illustrated here. For example, the order of operation of the denoise filter 202, signal analytic logic module 204, deinterlacer 206, and image enhancement (IE) logic module 208 may changed in to consider variations in pipe order and/or variations in the selection of signal analytic information sources.

In operation, by using temporal difference information between successive frames (e.g., Film Mode Detection (FMD) counters, any other temporal statistic between frames over video, the like, and/or combinations thereof), motion-adaptive denoising can be applied via adaptive control 104 to control filtering levels. By leveraging temporal information with proper confidence level estimation, the temporal filtering level can be applied adaptively via adaptive control 104 based on context. By using the temporal difference information between successive frames/fields, the motion range level can be inferred as variance of temporal difference between same polarity fields/frames of current and previous inputs.

Additionally or alternatively, a human visual system (HVS) based factor for noise level can be applied via adaptive control 104 to compensate non-proper filtering level. For example, such a human visual system (HVS)-modification of the denoise filtering may consider the image luminance level applied using image luma information. Accordingly, the estimated noise level may be rescaled with average luminance level per frame to reflect the human visual system (HVS) sensitivity to the noise in dark areas. For example, adaptive control denoise filtering can be adjusted via adaptive control 104 based at least in part on a no-reference noise metric. For example, as used herein the term "no-reference noise metric" may refer to situations in which there is not ground truth information in general. However, such noise metrics may be estimated using local variance information with conditional rejection. For example, based on such a conditional rejection, if a local variance is out of condition range, then it will not be included for overall noise metric estimation. Because of this spatial-oriented information, temporal motion-blur due to over-filtering can be created. To minimize this potential temporal artifact issues with the balanced noise reduction, motion-adaptive denoise filter control (MA-DNC) is proposed herein. The technique of estimating temporal noise level as a no-reference metric may be one important factor for the adaptive filtering described herein. Similarly, the technique of noise metric rescaling to reflect human visual system (HVS) sensitivity to the noise in the dark areas is helpful for a more adaptive performance. By employing these two techniques, a more appealing visual quality can be achieved after denoise filtering. Especially for temporal filtering case on high motion and/or high luminance input videos.

In some implementations, video pipe 102 may be included in a graphics processing unit (GPU) and/or central processing unit (CPU) (not shown here). Accordingly video pipe 102 may balance a combination of fixed function hardware portions of the pipeline with programmable portions of the pipeline. For example, fixed function media accelerators may allow for lower latency operations. Such fixed function media accelerators may include dedicated video processing units to perform functions, such as fixed function hardware for: video scaling, denoise filter, deinterlacer, detail/edge enhancement filter (not shown), and/or image enhancement (IE) logic module. For example, control logic for adaptive control 104 settings can be at the software level (e.g., via a driver) while read-back data for required statistics may be calculated in hardware (e.g., such as FMD counters and average pixel luma (APL)).

Additionally or alternatively, while the system and methods discussed herein for adaptive control for denoise filtering have been explained in the context of video pipe 102, these system and methods for adaptive control for denoise filtering may also be applied in the same or similar manner to denoise filters located in an encoder (e.g., as a pre-processing operation) and/or in a decoder (and/or decoder loop of an encoder).

As will be discussed in greater detail below, video processing system 200 may be used to perform some or all of the various functions discussed below in connection with FIGS. 3 and/or 4.

Figure 3:
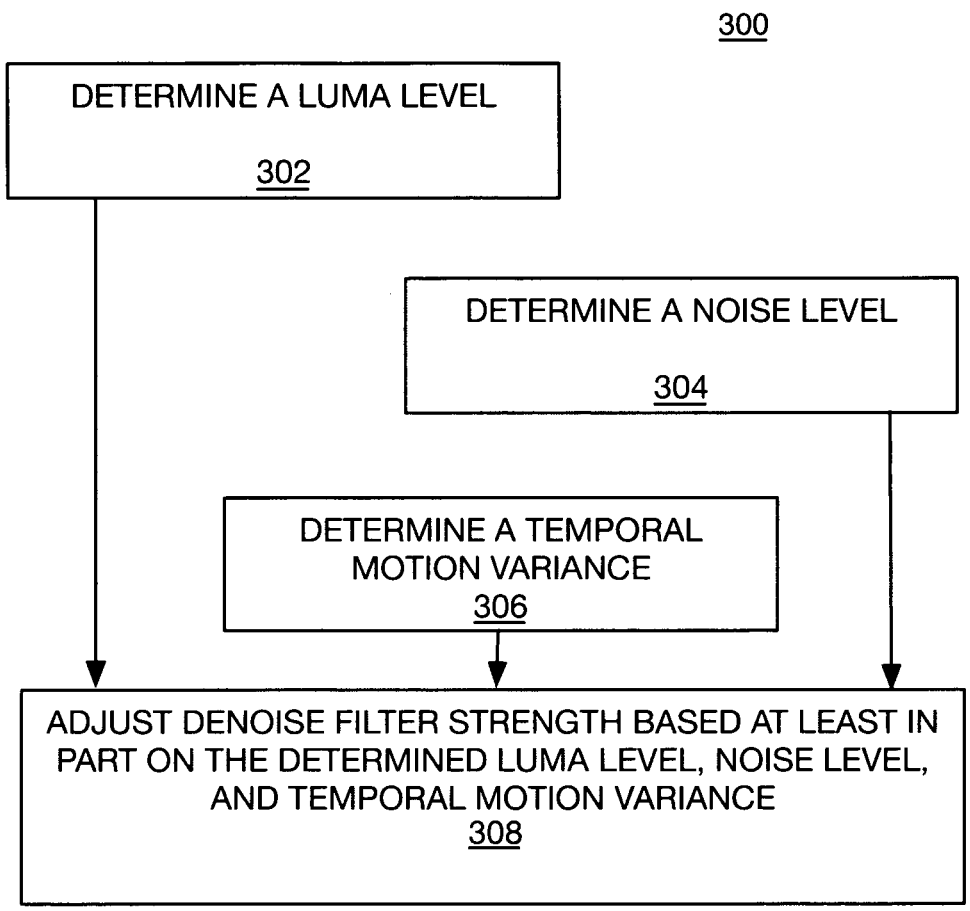
FIG. 3 is a flow diagram illustrating an example filtering process.

FIG. 3 is a flow diagram illustrating an example process 300, arranged in accordance with at least some implementations of the present disclosure. Process 300 may include one or more operations, functions or actions as illustrated by one or more of operations 302, etc.

Process 300 may begin at operation 302, 304, and/or 306, either executed concurrently or without any particular order.

At operation 302, "DETERMINE A LUMA LEVEL", where a luma level may be determined. For example, a luma level may be determined based at least in part on luma data associated with a frame of video being denoise filtered.

At operation 304, "DETERMINE A NOISE LEVEL", where a noise level may be determined. For example, a noise level may be determined based at least in part on noise data associated with the frame of video being denoise filtered.

At operation 306, "DETERMINE A TEMPORAL MOTION VARIANCE", where a temporal motion variance may be determined. For example, a temporal motion variance may be determined based at least in part on temporal motion data associated with the frame of video being denoise filtered.

Process 300 may continue at operation 308, "ADJUST DENOISE FILTER STRENGTH BASED AT LEAST IN PART ON THE DETERMINED LUMA LEVEL, NOISE LEVEL, AND TEMPORAL MOTION VARIANCE", where a denoise strength associated with a denoise filter may be adjusted. For example, a denoise strength associated with a denoise filter may be adjusted based at least in part on the determined luma level, noise level, and temporal motion variance.

Process 300 may provide for denoise filtering, which may be employed by a coder system and/or video pipe as discussed herein.

Some additional and/or alternative details related to process 300 and other processes discussed herein may be illustrated in one or more examples of implementations discussed herein and, in particular, with respect to FIG. 4 below.

Figure 4:
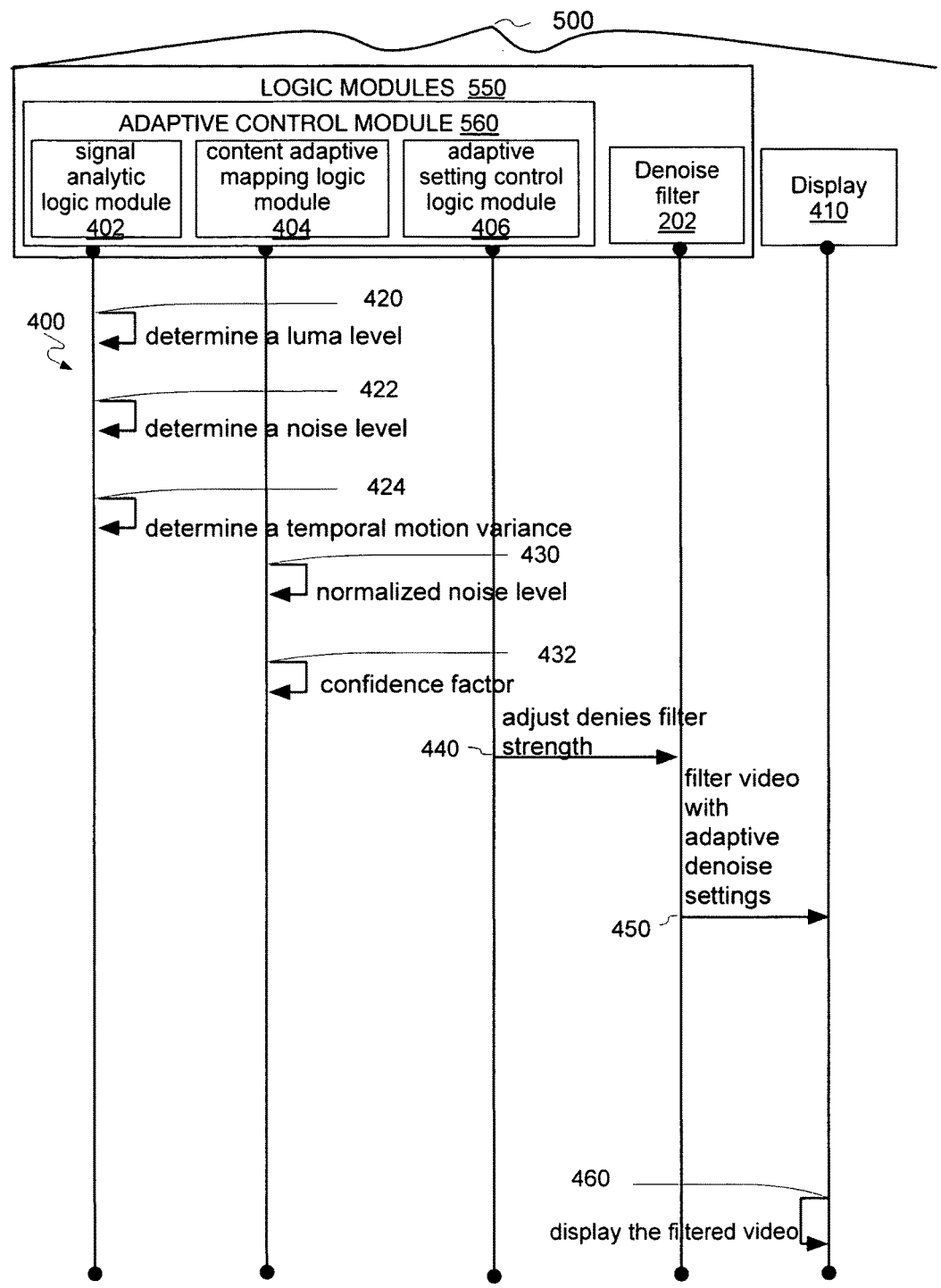
FIG. 4 provides an illustrative diagram of an example video processing system and video process in operation.

FIG. 4 provides an illustrative diagram of an example video processing system 500 (see, e.g., FIG. 5 for more details) and video coding process 400 in operation, arranged in accordance with at least some implementations of the present disclosure. In the illustrated implementation, process 400 may include one or more operations, functions or actions as illustrated by one or more of actions 420, etc.

By way of non-limiting example, process 400 will be described herein with reference to example video processing system 500 including denoise filter 202 of FIG. 2, as is discussed further herein below with respect to FIG. 5.

As illustrated, video processing system 500 (see, e.g., FIG. 5 for more details) may include logic modules 550. For example, logic modules 550 may include any modules as discussed with respect to any of the systems or subsystems described herein. For example, logic modules 550 may include a adaptive control module 560, which may include signal analytic logic module 402, content adaptive mapping logic module 404, adaptive setting control logic module 406, and/or the like.

Process 400 may begin at operation 420, "DETERMINE A LUMA LEVEL", where a luma level may be determined. For example, a luma level may be determined based at least in part on luma data associated with a frame of video being denoise filtered via signal analytic logic module 402.

In some implementations, determining the luma level may further include estimating a darkness level based at least in part on a number of pixels in a dark luma range, and estimating a lightness level based at least in part on a frame-level luma averages.

In some implementations, determining the luma level may further include determining the luma level based at least in part on a luma histogram.

In some implementations, the luma data may be obtained from signal analytic logic module 402 and/or from an image enhancement (IE) logic module (IMAGE ENHANCEMENT WITH COLOR PROCESSING (IECP)) (e.g., see IECP 208 in FIG. 2).

Process 400 may continue at operation 424, "DETERMINE A NOISE LEVEL", where a noise level may be determined. For example, a noise level may be determined based at least in part on noise data associated with the frame of video being denoise filtered via signal analytic logic module 402.

In some implementations, determining the noise level may further include determining the noise level based at least in part on any properly working noise level estimation method, such as a frame-level noise estimate algorithm, a Global Noise Estimate-type (GNE) algorithm, the like, and/or combinations thereof.

In some implementations, the noise data may be obtained from the denoise filter 202.

Process 400 may continue at operation 426, "DETERMINE A TEMPORAL MOTION VARIANCE", where a temporal motion variance may be determined. For example, a temporal motion variance may be determined based at least in part on temporal motion data associated with the frame of video being denoise filtered via signal analytic logic module 402.

In some implementations, determining the temporal motion variance may further include determining the temporal motion variance based at least in part on differences using two successive frames and/or fields.

In some implementations, determining the temporal motion variance may further include determining the temporal motion variance based at least in part on any properly working the temporal motion variance method, such as Film Mode Detection-type (FMD) variances, any other temporal statistic between frames over video, the like, and/or combinations thereof.

In some implementations, the temporal motion data may be obtained from the signal analytic logic module 402 and/or from deinterlacer (e.g., see deinterlacer 206 in FIG. 2).

In operation, signal analytic logic module 402 may generate input signal analytic information to be used for content adaptive control.

Process 400 may continue at operation 430, "NORMALIZED NOISE LEVEL", where a normalized noise level may be determined. For example, a normalized noise level may be determined to reflect human visual system sensitivity (e.g., rescaling of the existing noise level for better performance on dark scenes) to lightness and darkness levels based at least in part on the luma level and on the noise level, via content adaptive mapping logic module 404.

Process 400 may continue at operation 432, "CONFIDENCE FACTOR", where a confidence factor may be determined. For example, a confidence factor may be determined based at least in part on the temporal motion variance and on the noise level, via content adaptive mapping logic module 404.

Process 400 may continue at operation 440, "ADJUST DENOISE FILTER STRENGTH BASED AT LEAST IN PART ON THE DETERMINED LUMA LEVEL, NOISE LEVEL, AND TEMPORAL MOTION VARIANCE", where a denoise strength associated with a denoise filter may be adjusted. For example, a denoise strength associated with a denoise filter may be adjusted based at least in part on the determined luma level, noise level, and temporal motion variance, via adaptive setting control logic module 406.

In operation, adaptive setting control logic module 406 may apply optimal content adaptive settings in a continuous fashion for denoise processing.

Process 400 may continue at operation 450, "FILER VIDEO WITH ADAPTIVE DENOISE SETTINGS", where video may be filtered. For example, video may be filtered based at least in part on the adjusted denoise filter strength, via denoise filter 202.

Process 400 may continue at operation 460, "DISPLAY THE FILTERED VIDEO", where the filtered video may be displayed. For example, the filtered video may be displayed, via a display 410.

For example, adjusting the denoise strength based at least in part on the determined luma level, noise level, and temporal motion variance may further include adjusting the denoise strength based at least in part on the determined confidence factor and normalized noise level.

Some additional and/or alternative details related to process 400 and other processes discussed herein may be illustrated in one or more examples of implementations discussed herein and, in particular, with respect to FIG. 5 below.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more operations in response to instructions conveyed to the processor by a computer readable medium.

Figure 5:
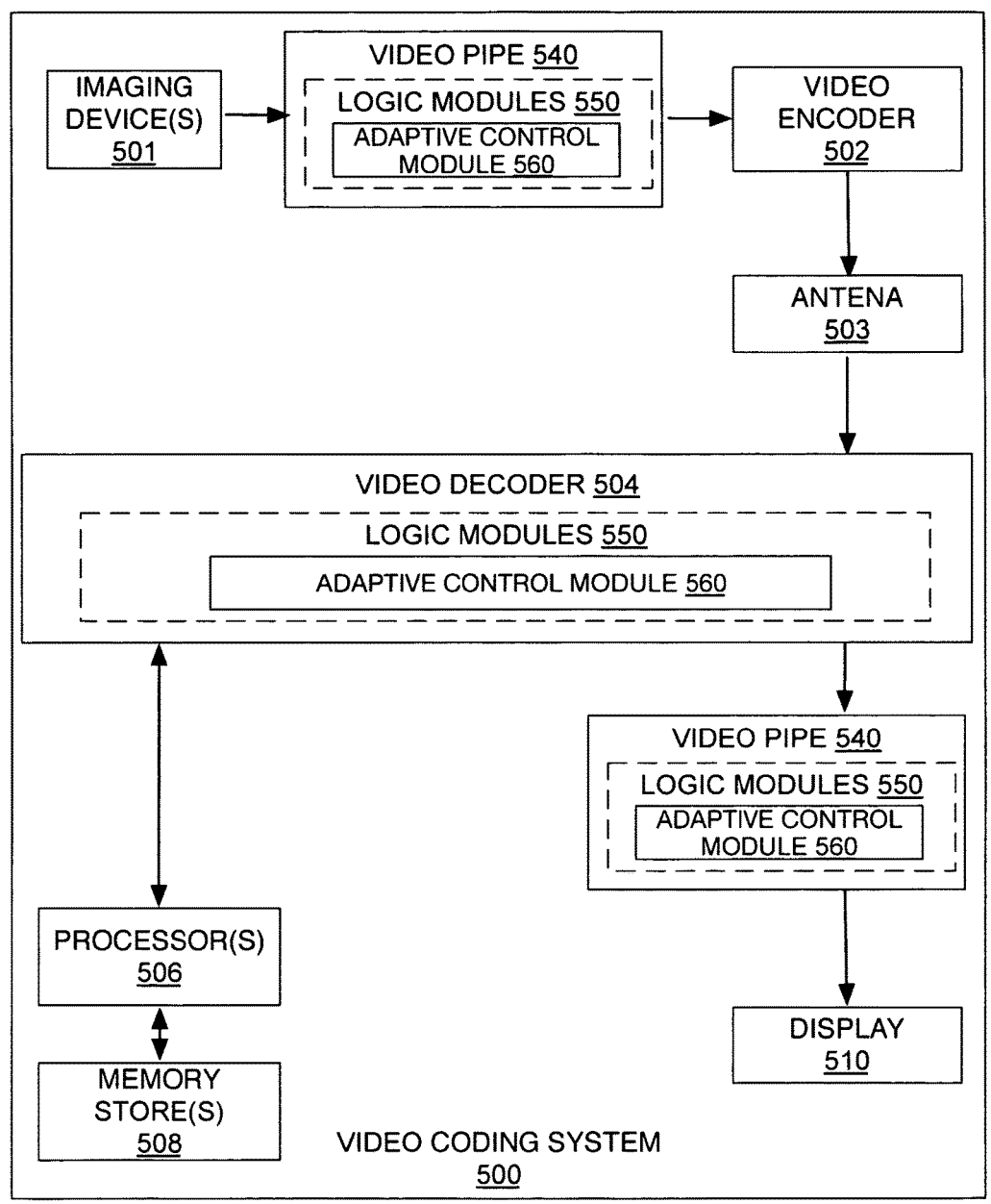
FIG. 5 is an illustrative diagram of an example video processing system.

FIG. 5 is an illustrative diagram of example video processing system 500, arranged in accordance with at least some implementations of the present disclosure. In the illustrated implementation, video processing system 500, although illustrated with both video encoder 502 and video decoder 504, video processing system 500 may include only video encoder 502 or only video decoder 504 in various examples. Video processing system 500 (which may include only video encoder 502 or only video decoder 504 in various examples) may include imaging device(s) 501, an antenna 502, one or more processor(s) 506, one or more memory store(s) 508, and/or a display device 510. As illustrated, imaging device(s) 501, antenna 502, video encoder 502, video decoder 504, processor(s) 506, memory store(s) 508, and/or display device 510 may be capable of communication with one another.

In some implementations, video processing system 500 may include antenna 503. For example, antenna 503 may be configured to transmit or receive an encoded bitstream of video data, for example. Processor(s) 506 may be any type of processor and/or processing unit. For example, processor(s) 506 may include distinct central processing units, distinct graphic processing units, integrated system-on-a-chip (SoC) architectures, the like, and/or combinations thereof. In addition, memory store(s) 508 may be any type of memory. For example, memory store(s) 508 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 508 may be implemented by cache memory. Further, in some implementations, video processing system 500 may include display device 510. Display device 510 may be configured to present video data.

As shown, in some examples, video processing system 500 may include logic modules 550. While illustrated as being associated with video decoder 504, video encoder 502 may similarly be associated with identical and/or similar logic modules as the illustrated logic modules 550. Accordingly, video decoder 504 may include all or portions of logic modules 550. For example, antenna 503, video decoder 504, processor(s) 506, memory store(s) 508, and/or display 510 may be capable of communication with one another and/or communication with portions of logic modules 550. Similarly, video encoder 502 may include identical and/or similar logic modules to logic modules 550. For example, imaging device(s) 501 and video encoder 502 may be capable of communication with one another and/or communication with logic modules that are identical and/or similar to logic modules 550.

In some implementations, logic modules 550 may embody various modules as discussed with respect to any system or subsystem described herein. In various embodiments, some of logic modules 550 may be implemented in hardware, while software may implement other logic modules. For example, in some embodiments, some of logic modules 550 may be implemented by application-specific integrated circuit (ASIC) logic while other logic modules may be provided by software instructions executed by logic such as processors 506. However, the present disclosure is not limited in this regard and some of logic modules 550 may be implemented by any combination of hardware, firmware and/or software.

For example, logic modules 550 may include an adaptive control module 560 and/or the like configured to implement operations of one or more of the implementations described herein.

Additionally or alternatively, in some examples, video processing system 500 may include video pipe 540. Video pipe 540 may include all or portions of logic modules 550, including adaptive control module 560 and/or the like configured to implement operations of one or more of the implementations described herein.

Further, while video pipe 540, including all or portions of adaptive control module 560, is illustrated here as being implemented as a post-processing-type pipe; video pipe 540, including all or portions of adaptive control module 560, may additionally or alternatively be implemented as a pre-processing-type pipe associated with encoder 502 (e.g., as a pre-processing operation) to implement operations of one or more of the implementations described herein.

Figure 6:
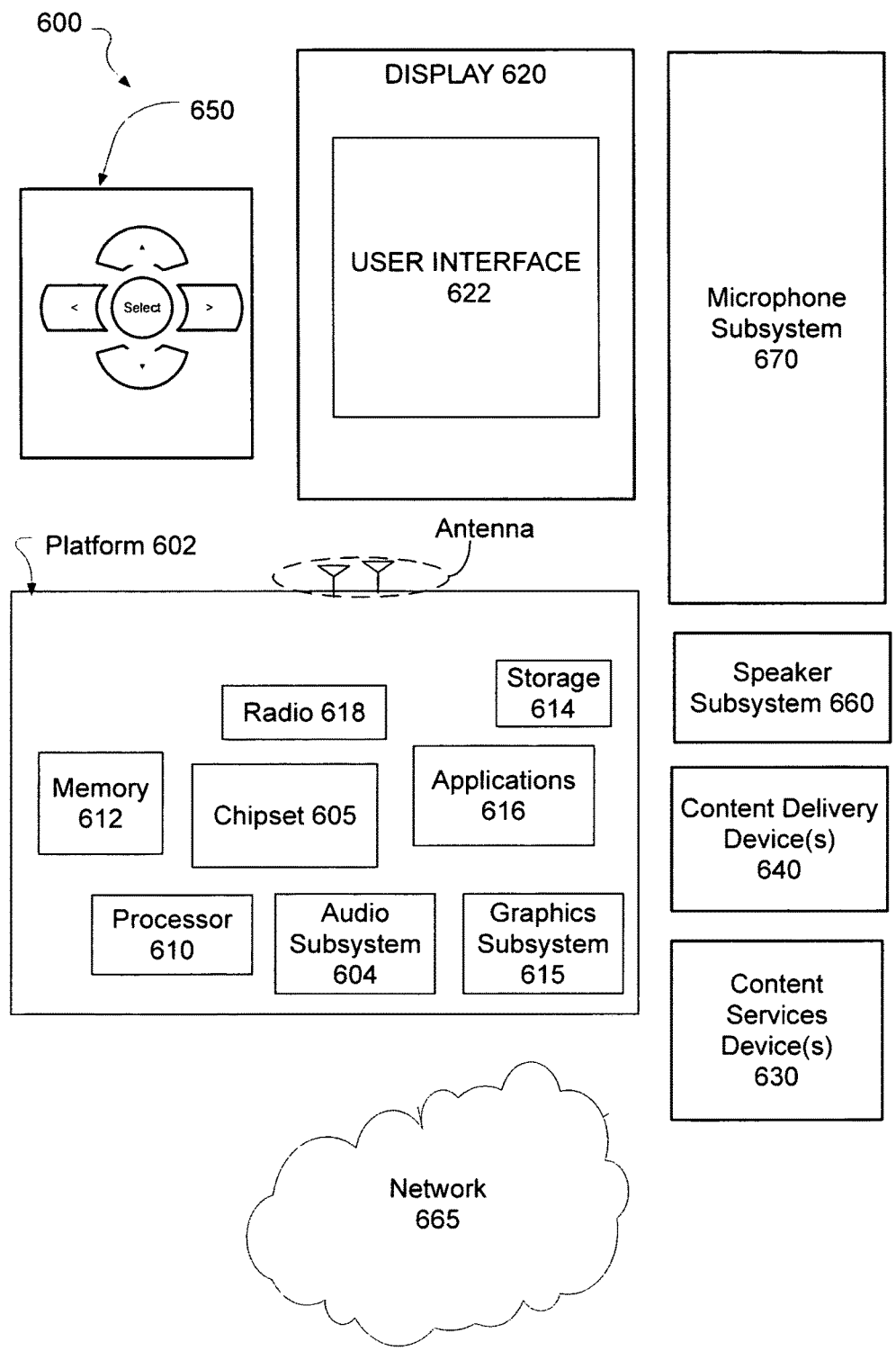
FIG. 6 is an illustrative diagram of an example system.

FIG. 6 is an illustrative diagram of an example system 600, arranged in accordance with at least some implementations of the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, antenna 613, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, Display Port, wireless HDMI, and/or wireless HD compliant techniques. Graphics subsystem 615 may be integrated into processor 610 or chipset 605. In some implementations, graphics subsystem 615 may be a stand-alone device communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In various embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622. In various embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for (5.1) surround sound audio and/or high definition (7.1) surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
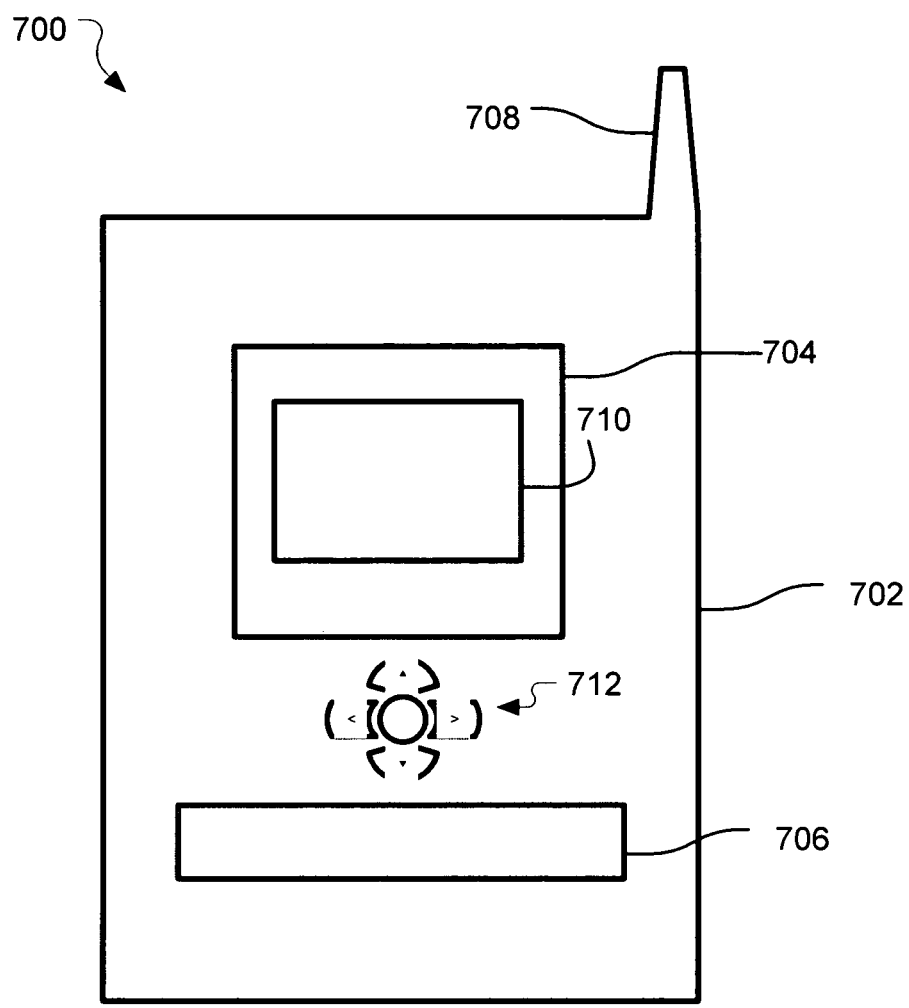
FIG. 7 is an illustrative diagram of an example system, all arranged in accordance with at least some implementations of the present disclosure.

As described above, system 600 may be embodied in varying physical styles or form factors. FIG. 7 illustrates implementations of a small form factor device 700 in which system 700 may be embodied. In various embodiments, for example, device 700 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704 which may include a user interface 710, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, image sensors, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems as discussed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video processing may include determining a luma level based at least in part on luma data associated with a frame of video being denoise filtered. A noise level may be determined based at least in part on noise data associated with the frame of video being denoise filtered. A temporal motion variance may be determined based at least in part on temporal motion data associated with the frame of video being denoise filtered. A denoise strength associated with a denoise filter may be adjusted based at least in part on the determined luma level, noise level, and temporal motion variance.

In another example, the computer-implemented method may include determining the luma level further including: estimating a darkness level based at least in part on a number of pixels in a dark luma range, and estimating a lightness level based at least in part on a frame-level luma averages. Determining the luma level may further include: determining the luma level based at least in part on a luma histogram. The luma data is obtained from a signal analytic logic module and/or from a image enhancement (IE) logic module. Determining the noise level may further include: determining the noise level based at least in part on a noise estimate-type algorithm. The noise data may be obtained from a denoise filter. Determining the temporal motion variance may further include: determining the temporal motion variance based at least in part on differences using two successive frames and/or field. Determining the temporal motion variance may further include: determining the temporal motion variance based at least in part on Film Mode Detection-type (FMD) variances. The temporal motion data is obtained from the signal analytic logic module and/or from a deinterlacer. A normalized noise level may be determined to reflect human visual system sensitivity to lightness and darkness levels based at least in part on the luma level and on the noise level. A confidence factor may be determined based at least in part on the temporal motion variance and on the noise level. The denoise strength may be adjusted based at least in part on the determined luma level, noise level, and temporal motion variance includes adjusting the denoise strength based at least in part on the determined confidence factor and normalized noise level. Video may be filtered, via the denoise filter, based at least in part on the adjusted denoise filter strength. The filtered video may be displayed via a display.

In other examples, a computer-implemented apparatus for video processing may include a graphics processing unit (GPU), the graphics processing unit configured to: determine a luma level based at least in part on luma data associated with a frame of video being denoise filtered. A noise level may be determined based at least in part on noise data associated with the frame of video being denoise filtered. A temporal motion variance may be determined based at least in part on temporal motion data associated with the frame of video being denoise filtered. A denoise strength associated with a denoise filter may be adjusted based at least in part on the determined luma level, noise level, and temporal motion variance.

In another example, the computer-implemented apparatus may include the graphics processing unit being further configured to: determine the luma level further including: estimating a darkness level based at least in part on a number of pixels in a dark luma range, and estimating a lightness level based at least in part on a frame-level luma averages. Determining the luma level may further include: determining the luma level based at least in part on a luma histogram. The luma data is obtained from a signal analytic logic module and/or from a image enhancement (IE) logic module. Determining the noise level may further include: determining the noise level based at least in part on a noise estimate-type algorithm. The noise data may be obtained from a denoise filter. Determining the temporal motion variance may further include: determining the temporal motion variance based at least in part on differences using two successive frames and/or field. Determining the temporal motion variance may further include: determining the temporal motion variance based at least in part on Film Mode Detection-type (FMD) variances. The temporal motion data is obtained from the signal analytic logic module and/or from a deinterlacer. A normalized noise level may be determined to reflect human visual system sensitivity to lightness and darkness levels based at least in part on the luma level and on the noise level. A confidence factor may be determined based at least in part on the temporal motion variance and on the noise level. The denoise strength may be adjusted based at least in part on the determined luma level, noise level, and temporal motion variance includes adjusting the denoise strength based at least in part on the determined confidence factor and normalized noise level. Video may be filtered, via the denoise filter, based at least in part on the adjusted denoise filter strength. The filtered video may be displayed via a display.

In other examples, a computer-implemented system for video processing may include one or more memory stores and a graphics processing unit (GPU) communicatively coupled to the one or more memory stores. The graphics processing unit may be configured to: determine a luma level based at least in part on luma data associated with a frame of video being denoise filtered. A noise level may be determined based at least in part on noise data associated with the frame of video being denoise filtered. A temporal motion variance may be determined based at least in part on temporal motion data associated with the frame of video being denoise filtered. A denoise strength associated with a denoise filter may be adjusted based at least in part on the determined luma level, noise level, and temporal motion variance.

In another example, the computer-implemented system may include the graphics processing unit being further configured to: determine the luma level further including: estimating a darkness level based at least in part on a number of pixels in a dark luma range, and estimating a lightness level based at least in part on a frame-level luma averages. Determining the luma level may further include: determining the luma level based at least in part on a luma histogram. The luma data is obtained from a signal analytic logic module and/or from a image enhancement (IE) logic module. Determining the noise level may further include: determining the noise level based at least in part on a noise estimate-type algorithm. The noise data may be obtained from a denoise filter. Determining the temporal motion variance may further include: determining the temporal motion variance based at least in part on differences using two successive frames and/or field. Determining the temporal motion variance may further include: determining the temporal motion variance based at least in part on Film Mode Detection-type (FMD) variances. The temporal motion data is obtained from the signal analytic logic module and/or from a deinterlacer. A normalized noise level may be determined to reflect human visual system sensitivity to lightness and darkness levels based at least in part on the luma level and on the noise level. A confidence factor may be determined based at least in part on the temporal motion variance and on the noise level. The denoise strength may be adjusted based at least in part on the determined luma level, noise level, and temporal motion variance includes adjusting the denoise strength based at least in part on the determined confidence factor and normalized noise level. Video may be filtered, via the denoise filter, based at least in part on the adjusted denoise filter strength. The filtered video may be displayed via a display.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video processing, comprising:
   determining a luma level based at least in part on luma data associated with a frame of video being denoise filtered;
   determining a noise level based at least in part on noise data associated with the frame of video being denoise filtered;
   determining a temporal motion variance based at least in part on temporal motion data associated with the frame of video being denoise filtered; and
   adjusting a denoise strength associated with a denoise filter based at least in part on the determined luma level, noise level, and temporal motion variance.

2. The method of claim 1,
   wherein determining the luma level further comprises: estimating a darkness level based at least in part on a number of pixels in a dark luma range, and estimating a lightness level based at least in part on a frame-level luma averages.

3. The method of claim 1,
   wherein determining the luma level further comprises: determining the luma level based at least in part on a luma histogram.

4. The method of claim 1, further comprising:
   wherein the luma data is obtained from a signal analytic logic module and/or from a image enhancement (IE) logic module.

5. The method of claim 1, further comprising:
   wherein determining the noise level further comprises: determining the noise level based at least in part on a noise estimate-type algorithm; and
   wherein the noise data is obtained from a denoise filter.

6. The method of claim 1, further comprising:
   wherein determining the temporal motion variance further comprises: determining the temporal motion variance based at least in part on differences using two successive frames and/or fields;
   wherein determining the temporal motion variance further comprises: determining the temporal motion variance based at least in part on Film Mode Detection-type (FMD) variances; and
   wherein the temporal motion data is obtained from the signal analytic logic module and/or from a deinterlacer.

7. The method of claim 1, further comprising:
   determining a normalized noise level to reflect human visual system sensitivity to lightness and darkness levels based at least in part on the luma level and on the noise level.

8. The method of claim 1, further comprising:
determining a confidence factor based at least in part on the temporal motion variance and on the noise level.

9. The method of claim 1, further comprising:
determining a normalized noise level to reflect human visual system sensitivity to lightness and darkness levels based at least in part on the luma level and on the noise level;
determining a confidence factor based at least in part on the temporal motion variance and on the noise level;
wherein adjusting the denoise strength based at least in part on the determined luma level, noise level, and temporal motion variance comprises adjusting the denoise strength based at least in part on the determined confidence factor and normalized noise level;
filtering video, via the denoise filter, based at least in part on the adjusted denoise filter strength; and
displaying, via a display, the filtered video.

10. The method of claim 1, further comprising:
wherein determining the luma level further comprises: estimating a darkness level based at least in part on a number of pixels in a dark luma range, and estimating a lightness level based at least in part on a frame-level luma averages;
wherein determining the luma level further comprises: determining the luma level based at least in part on a luma histogram;
wherein the luma data is obtained from a signal analytic logic module and/or from a image enhancement (IE) logic module;
wherein determining the noise level further comprises: determining the noise level based at least in part on a noise estimate-type algorithm;
wherein the noise data is obtained from a denoise filter;
wherein determining the temporal motion variance further comprises: determining the temporal motion variance based at least in part on differences using two successive frames and/or fields;
wherein determining the temporal motion variance further comprises: determining the temporal motion variance based at least in part on Film Mode Detection-type (FMD) variances;
wherein the temporal motion data is obtained from the signal analytic logic module and/or from a deinterlacer;
determining a normalized noise level to reflect human visual system sensitivity to lightness and darkness levels based at least in part on the luma level and on the noise level; and
determining a confidence factor based at least in part on the temporal motion variance and on the noise level;
wherein adjusting the denoise strength based at least in part on the determined luma level, noise level, and temporal motion variance comprises adjusting the denoise strength based at least in part on the determined confidence factor and normalized noise level;
filtering video, via the denoise filter, based at least in part on the adjusted denoise filter strength; and
displaying, via a display, the filtered video.

11. An apparatus for video processing, comprising:
a graphics processing unit (GPU), the graphics processing unit configured to:
determine a luma level based at least in part on luma data associated with a frame of video being denoise filtered;
determine a noise level based at least in part on noise data associated with the frame of video being denoise filtered;
determine a temporal motion variance based at least in part on temporal motion data associated with the frame of video being denoise filtered; and
adjust a denoise strength associated with a denoise filter based at least in part on the determined luma level, noise level, and temporal motion variance.

12. The apparatus of claim 11,
wherein determining the luma level further comprises: estimating a darkness level based at least in part on a number of pixels in a dark luma range, and estimating a lightness level based at least in part on a frame-level luma averages;
wherein determining the luma level further comprises: determining the luma level based at least in part on a luma histogram; and
wherein the luma data is obtained from a signal analytic logic module and/or from a image enhancement (IE) logic module.

13. The apparatus of claim 11,
wherein determining the noise level further comprises: determining the noise level based at least in part on a noise estimate-type algorithm; and
wherein the noise data is obtained from a denoise filter.

14. The apparatus of claim 11,
wherein determining the temporal motion variance further comprises: determining the temporal motion variance based at least in part on differences using two successive frames and/or fields;
wherein determining the temporal motion variance further comprises: determining the temporal motion variance based at least in part on Film Mode Detection-type (FMD) variances; and
wherein the temporal motion data is obtained from the signal analytic logic module and/or from a deinterlacer.

15. The apparatus of claim 11, the graphics processing unit further configured to:
determine a normalized noise level to reflect human visual system sensitivity to lightness and darkness levels based at least in part on the luma level and on the noise level;
determine a confidence factor based at least in part on the temporal motion variance and on the noise level;
wherein adjusting the denoise strength based at least in part on the determined luma level, noise level, and temporal motion variance comprises adjusting the denoise strength based at least in part on the determined confidence factor and normalized noise level;
filter video, via the denoise filter, based at least in part on the adjusted denoise filter strength; and
display, via a display, the filtered video.

16. The apparatus of claim 11, the graphics processing unit further configured to:
wherein determining the luma level further comprises: estimating a darkness level based at least in part on a number of pixels in a dark luma range, and estimating a lightness level based at least in part on a frame-level luma averages;
wherein determining the luma level further comprises: determining the luma level based at least in part on a luma histogram;
wherein the luma data is obtained from a signal analytic logic module and/or from a image enhancement (IE) logic module;
wherein determining the noise level further comprises: determining the noise level based at least in part on a noise estimate-type algorithm;
wherein the noise data is obtained from a denoise filter;

wherein determining the temporal motion variance further comprises: determining the temporal motion variance based at least in part on differences using two successive frames and/or fields;

wherein determining the temporal motion variance further comprises: determining the temporal motion variance based at least in part on Film Mode Detection-type (FMD) variances;

wherein the temporal motion data is obtained from the signal analytic logic module and/or from a deinterlacer;

determine a normalized noise level to reflect human visual system sensitivity to lightness and darkness levels based at least in part on the luma level and on the noise level;

determine a confidence factor based at least in part on the temporal motion variance and on the noise level;

wherein adjusting the denoise strength based at least in part on the determined luma level, noise level, and temporal motion variance comprises adjusting the denoise strength based at least in part on the determined confidence factor and normalized noise level;

filter video, via the denoise filter, based at least in part on the adjusted denoise filter strength; and display, via a display, the filtered video.

17. A system for video processing, comprising:
one or more memory stores;
a graphics processing unit (GPU) communicatively coupled to the one or more memory stores, the graphics processing unit configured to:
  determine a luma level based at least in part on luma data associated with a frame of video being denoise filtered;
  determine a noise level based at least in part on noise data associated with the frame of video being denoise filtered;
  determine a temporal motion variance based at least in part on temporal motion data associated with the frame of video being denoise filtered; and
  adjust a denoise strength associated with a denoise filter based at least in part on the determined luma level, noise level, and temporal motion variance.

18. The system of claim 17,
wherein determining the temporal motion variance further comprises: determining the temporal motion variance based at least in part on differences using two successive frames and/or fields;
wherein determining the temporal motion variance further comprises: determining the temporal motion variance based at least in part on Film Mode Detection-type (FMD) variances; and
wherein the temporal motion data is obtained from the signal analytic logic module and/or from a deinterlacer.

19. The system of claim 17, the graphics processing unit further configured to:
determine a normalized noise level to reflect human visual system sensitivity to lightness and darkness levels based at least in part on the luma level and on the noise level;
determine a confidence factor based at least in part on the temporal motion variance and on the noise level;
wherein adjusting the denoise strength based at least in part on the determined luma level, noise level, and temporal motion variance comprises adjusting the denoise strength based at least in part on the determined confidence factor and normalized noise level;
filter video, via the denoise filter, based at least in part on the adjusted denoise filter strength; and
display, via a display, the filtered video.

20. The system of claim 17, the graphics processing unit further configured to:
wherein determining the luma level further comprises: estimating a darkness level based at least in part on a number of pixels in a dark luma range, and estimating a lightness level based at least in part on a frame-level luma averages;
wherein determining the luma level further comprises: determining the luma level based at least in part on a luma histogram;
wherein the luma data is obtained from a signal analytic logic module and/or from a image enhancement (IE) logic module;
wherein determining the noise level further comprises: determining the noise level based at least in part on a noise estimate-type algorithm;
wherein the noise data is obtained from a denoise filter;
wherein determining the temporal motion variance further comprises: determining the temporal motion variance based at least in part on differences using two successive frames and/or fields;
wherein determining the temporal motion variance further comprises: determining the temporal motion variance based at least in part on Film Mode Detection-type (FMD) variances;
wherein the temporal motion data is obtained from the signal analytic logic module and/or from a deinterlacer;
determine a normalized noise level to reflect human visual system sensitivity to lightness and darkness levels based at least in part on the luma level and on the noise level;
determine a confidence factor based at least in part on the temporal motion variance and on the noise level;
wherein adjusting the denoise strength based at least in part on the determined luma level, noise level, and temporal motion variance comprises adjusting the denoise strength based at least in part on the determined confidence factor and normalized noise level;
filter video, via the denoise filter, based at least in part on the adjusted denoise filter strength; and
display, via a display, the filtered video.

21. At least one non-transitory machine readable medium comprising: a plurality of instructions that in response to being executed on a computing device, causes the computing device to perform:
determine a luma level based at least in part on luma data associated with a frame of video being denoise filtered;
determine a noise level based at least in part on noise data associated with the frame of video being denoise filtered;
determine a temporal motion variance based at least in part on temporal motion data associated with the frame of video being denoise filtered; and
adjust a denoise strength associated with a denoise filter based at least in part on the determined luma level, noise level, and temporal motion variance.

22. The at least one non-transitory machine readable medium method of claim 21, further comprising:
wherein determining the luma level further comprises: estimating a darkness level based at least in part on a number of pixels in a dark luma range, and estimating a lightness level based at least in part on a frame-level luma averages;
wherein determining the luma level further comprises: determining the luma level based at least in part on a luma histogram;

wherein the luma data is obtained from a signal analytic logic module and/or from a image enhancement (IE) logic module;
wherein determining the noise level further comprises: determining the noise level based at least in part on a noise estimate-type algorithm;
wherein the noise data is obtained from a denoise filter;
wherein determining the temporal motion variance further comprises: determining the temporal motion variance based at least in part on differences using two successive frames and/or fields;
wherein determining the temporal motion variance further comprises: determining the temporal motion variance based at least in part on Film Mode Detection-type (FMD) variances;
wherein the temporal motion data is obtained from the signal analytic logic module and/or from a deinterlacer;
determine a normalized noise level to reflect human visual system sensitivity to lightness and darkness levels based at least in part on the luma level and on the noise level;
determine a confidence factor based at least in part on the temporal motion variance and on the noise level;
wherein adjusting the denoise strength based at least in part on the determined luma level, noise level, and temporal motion variance comprises adjusting the denoise strength based at least in part on the determined confidence factor and normalized noise level;
filter video, via the denoise filter, based at least in part on the adjusted denoise filter strength; and
display, via a display, the filtered video.

* * * * *